United States Patent
Hatori et al.

(10) Patent No.: US 9,612,411 B2
(45) Date of Patent: Apr. 4, 2017

(54) SEMICONDUCTOR OPTICAL WAVEGUIDE DEVICE WITH AN ANTI-REFLECTION DIFFRACTION GRATING FORMED ON BOTH LATERAL SIDES OF A CORE LAYER ALONG A DIRECTION OF OPTICAL PROPAGATION

(71) Applicants: FUJITSU LIMITED, Kawasaki-shi, Kanagawa (JP); NEC Corporation, Minato-ku, Tokyo (JP)

(72) Inventors: Nobuaki Hatori, Tsukuba (JP); Masashige Ishizaka, Tokyo (JP); Takanori Shimizu, Tokyo (JP)

(73) Assignees: FUJITSU LIMITED, Kawasaki (JP); NEC CORPORATION, Tokyo (JP)

( * ) Notice: Subject to any disclaimer, the term of this patent is extended or adjusted under 35 U.S.C. 154(b) by 0 days.

(21) Appl. No.: 14/663,768

(22) Filed: Mar. 20, 2015

(65) Prior Publication Data

US 2015/0277072 A1    Oct. 1, 2015

(30) Foreign Application Priority Data

Mar. 31, 2014    (JP) ................. 2014-073357

(51) Int. Cl.
*G02B 6/42* (2006.01)
*G02B 6/124* (2006.01)

(52) U.S. Cl.
CPC .......... *G02B 6/4266* (2013.01); *G02B 6/124* (2013.01); *G02B 6/4207* (2013.01)

(58) Field of Classification Search
None
See application file for complete search history.

(56) References Cited

U.S. PATENT DOCUMENTS

| 6,449,411 | B1 | 9/2002 | Nakamura | |
| 6,571,028 | B1* | 5/2003 | LoCascio | B82Y 10/00 359/244 |
| 2003/0099428 | A1* | 5/2003 | LoCascio | B82Y 10/00 385/16 |
| 2011/0092007 | A1* | 4/2011 | Lee | G03F 7/0005 438/32 |
| 2013/0130363 | A1* | 5/2013 | Lundquist | G01N 21/6452 435/287.2 |
| 2015/0203909 | A1* | 7/2015 | Lundquist | G01N 21/6452 506/9 |
| 2015/0277072 | A1* | 10/2015 | Hatori | G02B 6/4295 385/14 |

FOREIGN PATENT DOCUMENTS

| JP | H05-91049 | 4/1993 |
| JP | 2001-560 | 1/2001 |
| JP | 2001-66560 A1 | 3/2001 |

* cited by examiner

*Primary Examiner* — Andrew Jordan
(74) *Attorney, Agent, or Firm* — Kratz, Quintos & Hanson, LLP (57) ABSTRACT

Light that returns through reflection from the optical connection portion between a semiconductor optical waveguide and an optically functional element is reduced through the use of a simplified structure in a semiconductor optical waveguide device. The device is provided with an anti-reflection diffraction grating having the period to prevent light that has been led through the semiconductor optical waveguide towards the portion connected to the optically functional element from being reflected in the direction from which the light has been led.

8 Claims, 12 Drawing Sheets

END OF MMI THROUGH WHICH LIGHT ENTERS

FIG. 12B

SEMICONDUCTOR OPTICAL WAVEGUIDE DEVICE WITH AN ANTI-REFLECTION DIFFRACTION GRATING FORMED ON BOTH LATERAL SIDES OF A CORE LAYER ALONG A DIRECTION OF OPTICAL PROPAGATION

CROSS-REFERENCE TO RELATED APPLICATION

This application is based upon and claims the benefit of priority of the prior Japanese Patent Application No. 2014-073357, filed on Mar. 31, 2014, the entire contents of which are incorporated herein by reference.

FIELD

The present invention relates to a semiconductor optical waveguide device, and in particular, to a semiconductor optical waveguide device used for optical interconnections using optical wires on an Si substrate such as between boards, between chips or inside of a chip, or used for optical fiber communication using optical fibers.

BACKGROUND

In order to overcome the limitations in high speed operation in a large scale integrated circuit (LSI) with electrical wires, faster signal communication between chips has been attempted by forming an optical circuit on an Si substrate. The optical circuit is formed of optically functional elements such as an optical modulator for modulating an input signal, an optical receiver for receiving signal light and a splitter for branching light. Light is input to these optical functional elements via an optical waveguide for propagating an optical signal.

When such an optical circuit is formed on a semiconductor substrate, light is reflected from connections between an optical waveguide and an optically functional element due to the effects of a mode mismatch caused by a mismatch in the refractive index. The reflected light is led along the optical waveguide in the reverse direction and, thus, noise is generated. Light is reflected from portions other that the portions connected to an optically functional element, for example, from a terminal of an optical waveguide, which causes noise.

In order to reduce light reflected from optical connections that may cause noise in an optical receiver as described above, it has been proposed to provide a diffraction grating reflecting mirror that operates as a filter directly in front of the input terminal of the optical receiver (see Patent Document 1). It has also been proposed to cut an optical waveguide diagonally relative to the direction in which an optical signal propagates in order to structurally prevent a terminal from allowing an optical signal to return in the direction in which the optical signal has been propagated (see Patent Document 2).

PRIOR ART DOCUMENTS

Patent Documents

Patent Document 1: Japanese Laid-open Patent Publication No. H05(1993)-091049
Patent Document 2: Japanese Laid-open Patent Publication No. 2001-066560

SUMMARY

However, the above described proposals have such a problem wherein the propagated light may return through the optical waveguide or may become stray light within the element and, thus, may induce noise in other portions.

According to an aspect of the embodiment, a semiconductor optical waveguide device includes; a semiconductor substrate; an optically functional element provided on the semiconductor substrate; and a semiconductor optical waveguide with a core layer including an anti-reflection diffraction grating that is provided on the semiconductor substrate and which has the period to prevent light that has been led towards a portion connected to the optically functional element from being reflected in the direction from which the light has been led.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
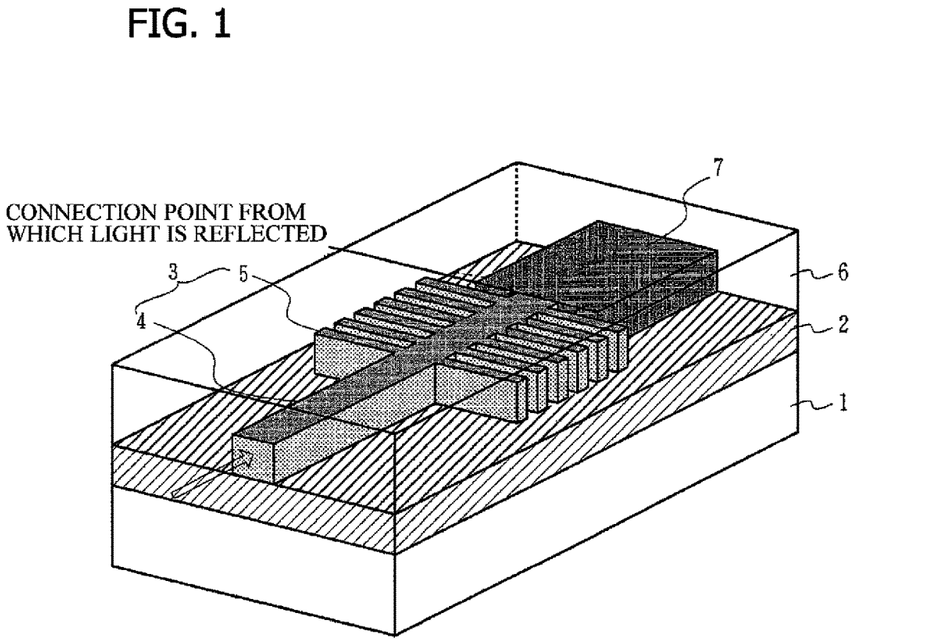
FIG. 1 is a schematic perspective diagram illustrating the semiconductor optical waveguide device according to embodiments of the present invention.

In reference to FIGS. 1 to 3B, the semiconductor optical waveguide device according to embodiments of the present invention is described below. FIG. 1 is a schematic perspective diagram illustrating the semiconductor optical waveguide device according to embodiments of the present invention. The semiconductor optical waveguide device according to the embodiments of the present invention is formed by connecting a semiconductor optical waveguide 3 provided on a semiconductor substrate 1 to an optically functional element 7 at an optical connection portion. At this time, the semiconductor optical waveguide 3 has a core layer 4 that is provided with an anti-reflection diffraction grating 5 having the period to prevent the light that has been guided towards the side of the portion connected to the optically functional element 7 from being reflected in the direction from which the light has been led. Here, the optical connection portion becomes a connection point from which light is reflected.

In this case, the anti-reflection diffraction grating 5 may be a diffraction grating provided on a side surface of the core layer 4 or may be a diffraction grating provided on the upper surface of the core layer 4. In addition, the width and the pitch of high refractive index portions and low refractive index portions in the diffraction grating are determined through results of a simulation in accordance with the structure or the component material of the structure of the optically functional element 7 that is connected or through the feedback of the reflective characteristics of the actual device that has been made on the basis of the results of the simulation. In the case wherein an SOI substrate is used, a BOX layer made of an oxide film 2 becomes a lower clad layer and the insulating film that covers the element structure becomes an upper clad layer 6.

In addition, a temperature control element may be provided on top of the anti-reflection diffraction grating 5 through the upper clad layer 6 in order to use the dependency of the reflective characteristics of the anti-reflection diffraction grating on the temperature. By providing such a temperature control element the reflective characteristics can be adjusted in accordance with the temperature in the case wherein the actual reflective characteristics differs from the designed value. Here, the temperature control element may be a heater using a resistor or may be a Peltier effect element. In the case of a Peltier effect element, both heating and cooling are possible depending on the direction in which current is injected.

The optically functional element 7 typically includes a semiconductor light receiving element, an electro-absorption modulator and a multi-mode interference waveguide (MMI). In the case when applied to Si photonics, it is desirable for Ge or SiGe to be used for the semiconductor light receiving element or the electro-absorption modulator, and it is desirable for an SOI layer, that is to say, a monocrystalline silicon layer provided on an SOI substrate to be used for the MMI.

In the case of a semiconductor light receiving element or an electro-absorption modulator, the remaining part of the SOI layer after the formation of the core layer 4 may be used as a terrace for forming an element, on top of which a Ge layer or a SiGe layer may be grown to form an element. Alternatively, a semiconductor light receiving element or an electro-absorption modulator that has been made separately may be mounted on the Si substrate in a hybrid manner. In this case the Si substrate in the SOI substrate may be processed so as to provide an alignment mark and pedestals on which the element is mounted.

In the case wherein a semiconductor light receiving element or an electro-absorption modulator is mounted on the Si substrate in a hybrid manner, the end surface of the semiconductor light receiving element or of the electro-absorption modulator through which light enters may be inclined relative to the optical axis in order to prevent reflected light from entering into the semiconductor optical waveguide 3.

Figure 2A:
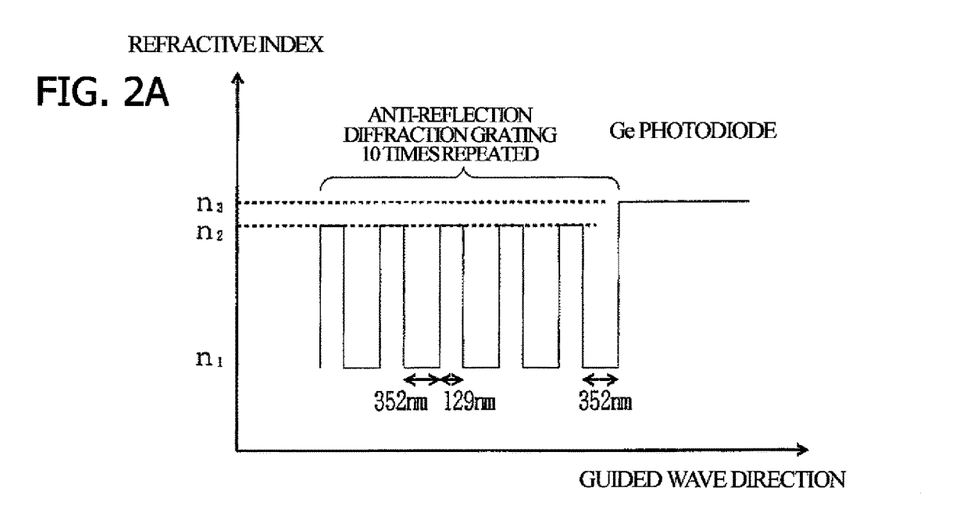
FIGS. 2A and 2B are graphs illustrating the results of a simulation of the anti-reflection diffraction grating in the embodiments of the present invention.

FIGS. 2A and 2B are graphs illustrating the results of a simulation of the anti-reflection diffraction grating in the embodiments of the present invention. As illustrated in FIG. 2A, a simulation was carried out on a semiconductor optical waveguide device where a Si optical waveguide and a Ge photodiode were connected. An SOI substrate was used where a BOX layer having a thickness of 3 μm and a Si layer having a thickness of 220 nm were provided on a Si substrate, and the width of the Si core layer was 450 nm. In addition, the diffraction grating has a period of 481 nm with a high refractive index portion (Si) of 129 nm and a low refractive index portion ($SiO_2$) of 352 nm and the repetition number of the diffraction grating is ten.

In the structure without a diffraction grating, a signal light with a wavelength of 1.55 μm that has propagated through the Si core layer passes through the diffraction grating portion so as to enter the Ge photodiode. At this time, though the majority of the light is absorbed by the depletion layer in the Ge photodiode as the signal, a portion of the light is reflected from the portion connected to the Si core layer so as to propagate back through the Si core layer as returning light.

Figure 2B:
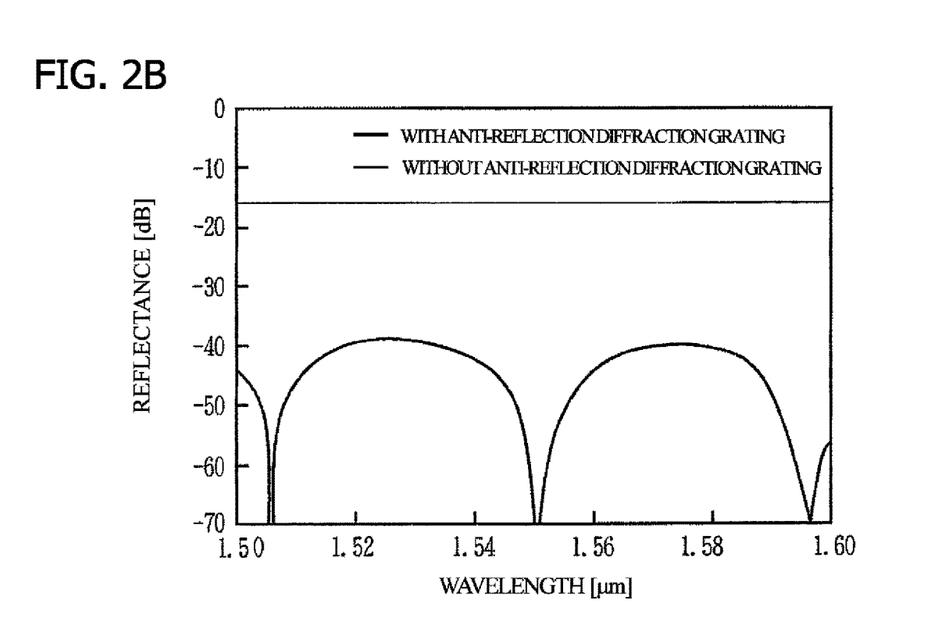

In this case, as illustrated in FIG. 2B, the reflectance is approximately −16 dB according to the calculation. Meanwhile, in the embodiments of the present invention an anti-reflection diffraction grating is introduced so that the reflectance can be suppressed to −40 dB or less for the wavelength in the vicinity of 1.55 μm. This is because the light reflected from the respective diffraction grating junctions in the diffraction grating interferes with the light reflected from the Ge photodiode, resulting in synthesized waves with an amplitude of 0 as a whole.

Figure 3A:
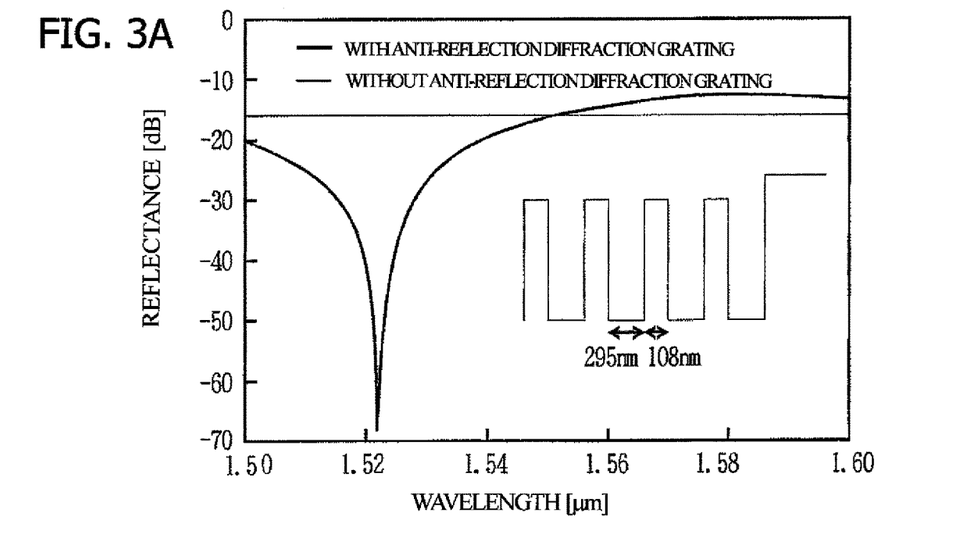
FIGS. 3A and 3B are graphs illustrating an example of an inappropriate diffraction grating.
Figure 3B:
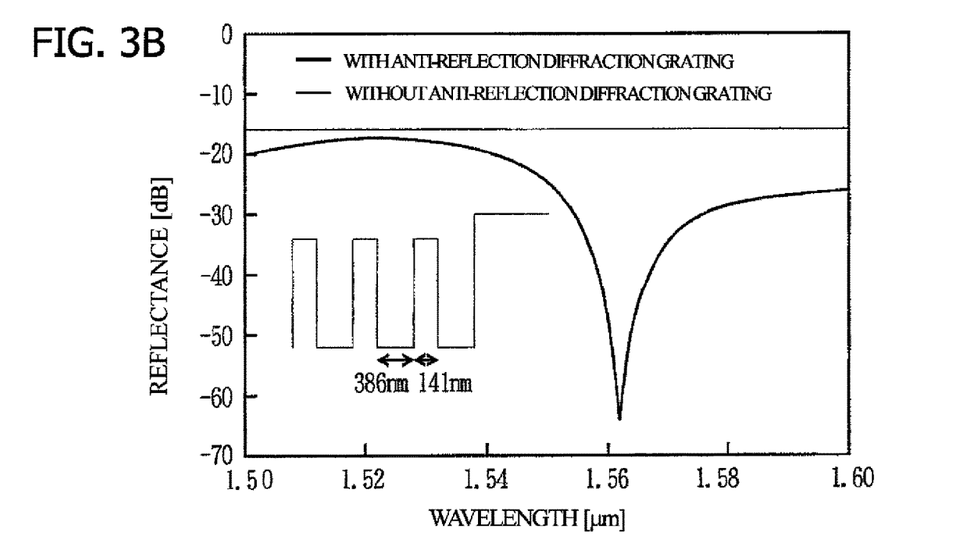

FIGS. 3A and 3B are graphs illustrating an example of an inappropriate diffraction grating resulting from a simulation that has been carried out by varying the thicknesses of the high refractive index portions and the low refractive index portions, and thus by varying the period of the diffraction grating while maintaining the other conditions the same as in the case of FIGS. 2A and 2B. FIG. 3A illustrates the results of a simulation in the case wherein the diffraction grating has a period of 403 nm with a high refractive index portion (Si) of 108 nm and a low refractive index portion ($SiO_2$) of 295 nm. As illustrated in FIG. 3A, though the reflectance is −20 dB for the wavelength in a narrow range in the vicinity of 1.52 μm, the reflectance is greater than in the case wherein no diffraction grating is provided for wavelengths of 1.55 μm or greater.

FIG. 3B illustrates the results of a simulation in the case wherein the diffraction grating has a period of 527 nm with a high refractive index portion (Si) of 141 nm and a low refractive index portion ($SiO_2$) of 386 nm. As illustrated in FIG. 3B, though the reflectance is −30 dB for the wavelength in a narrow range in the vicinity of 1.56 μm, the reflectance is approximately the same as in the case wherein no diffraction grating is provided for wavelengths of 1.54 μm or less. The width and the pitch of high refractive index portions and low refractive index portions in such a diffraction grating are determined through results of a simulation in accordance with the structure or the component material of the optically functional element 7 that is connected as described above or through the feedback of the reflective characteristics of the actual device that has been made on the basis of the results of the simulation.

Thus, in the semiconductor optical waveguide device according to the embodiments of the present invention, an anti-reflection diffraction grating is provided on the side of the portion connected to the optically functional element in the semiconductor optical waveguide and, therefore, light reflected from the connection point can be effectively reduced through the effects of optical interference.

And according to the disclosed semiconductor optical waveguide device, it is possible to reduce light that returns through reflection from the optical connection portion between a semiconductor optical waveguide and an optically functional element through the use of a simplified structure.

First Embodiment

Figure 4:
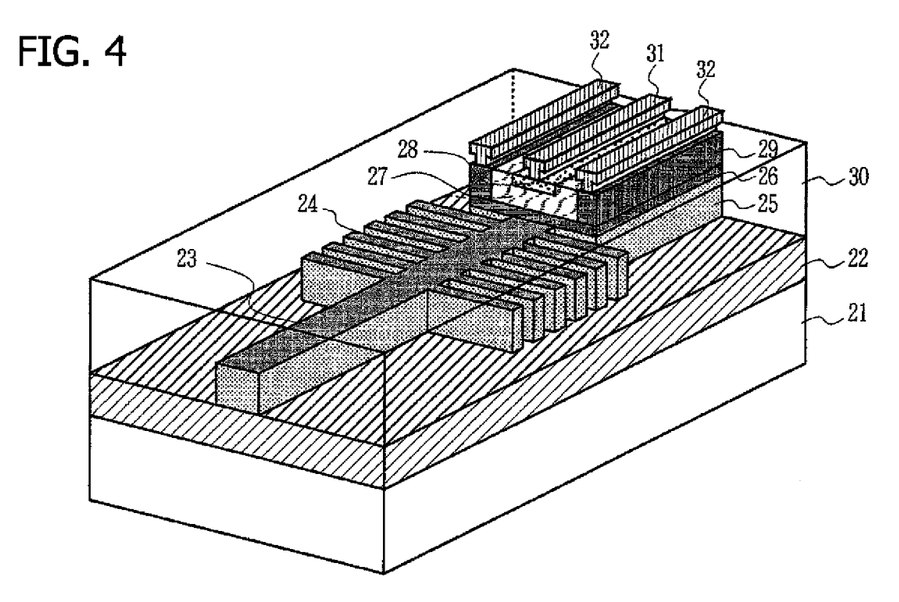
FIG. 4 is a schematic perspective diagram illustrating the semiconductor optical waveguide device according to the first embodiment of the present invention.

Next, in reference to FIGS. 4 to 7, the semiconductor optical waveguide device according to the first embodiment of the present invention is described. FIG. 4 is a schematic perspective diagram illustrating the semiconductor optical waveguide device according to the first embodiment of the present invention, wherein an SOI substrate is used where a monocrystalline Si layer having a thickness of 220 nm is provided on an Si substrate 21 with a BOX layer 22 having a thickness of 3 μm in between. The monocrystalline Si layer is processed so that an anti-reflection diffraction grating 24 where the corrugation has a period of 481 nm with a protruding portion having a width of 129 nm and a gap portion having a width of 352 nm and the repetition number is ten is formed on the side of the connection portion between a Si core layer 23 having a width of 450 nm and a Ge photodiode. Here, the length of the protruding portions is 1.5 μm. At this time the single crystal Si layer in the direction in which the Si core layer 23 extends is processed so as to provide a terrace for forming an element 25.

A p type Ge layer 26 and an i type Ge layer 27 are deposited in sequence on the terrace for forming an element 25, and an n type Ge layer 28 and a p type Ge layer 29 are formed by ion implantation, and then an n side electrode 31 and a p side electrode 32 are formed so as to provide a Ge photodiode. Here, the $SiO_2$ film 30, which becomes a passivation film at the time when the n side electrode 31 and the p side electrode 32 are formed, becomes an upper clad layer of the semiconductor optical waveguide.

Figures 5A, 5B:
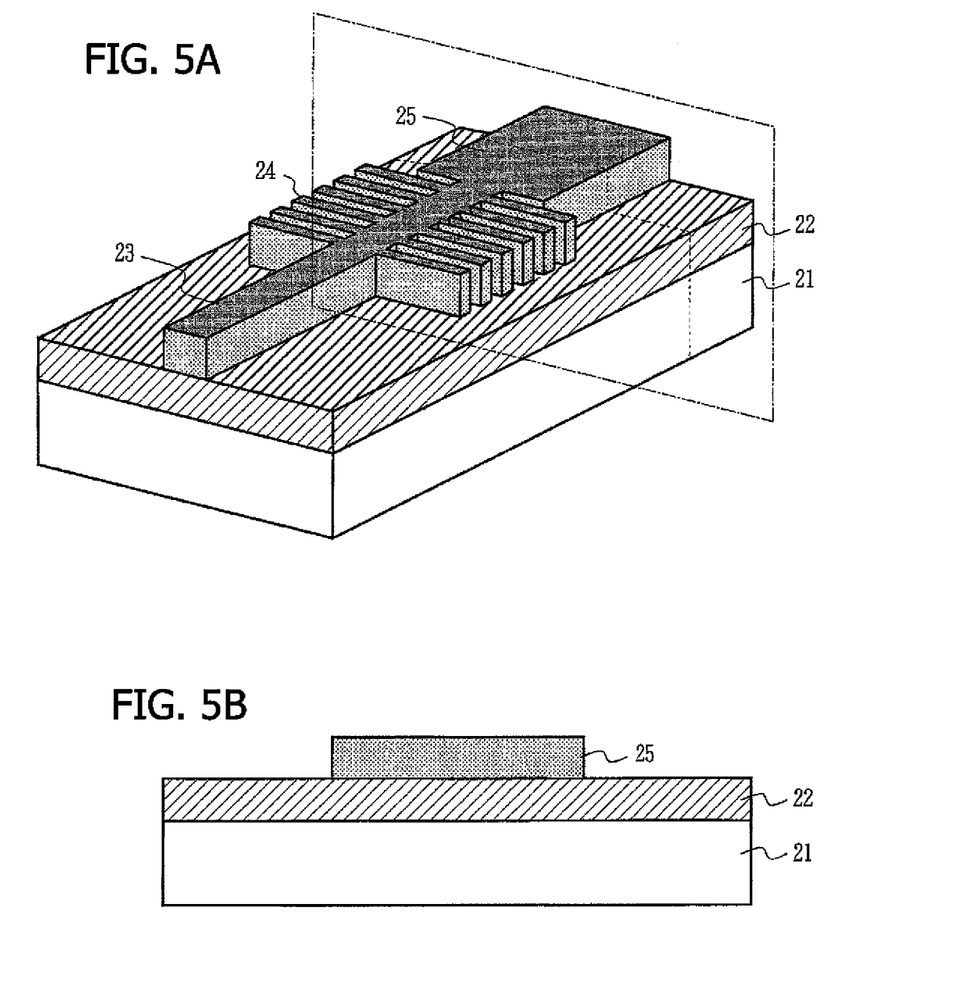
FIGS. 5A and 5B are diagrams illustrating a step during the manufacture of the semiconductor optical waveguide device according to the first embodiment of the present invention.
Figure 6A:
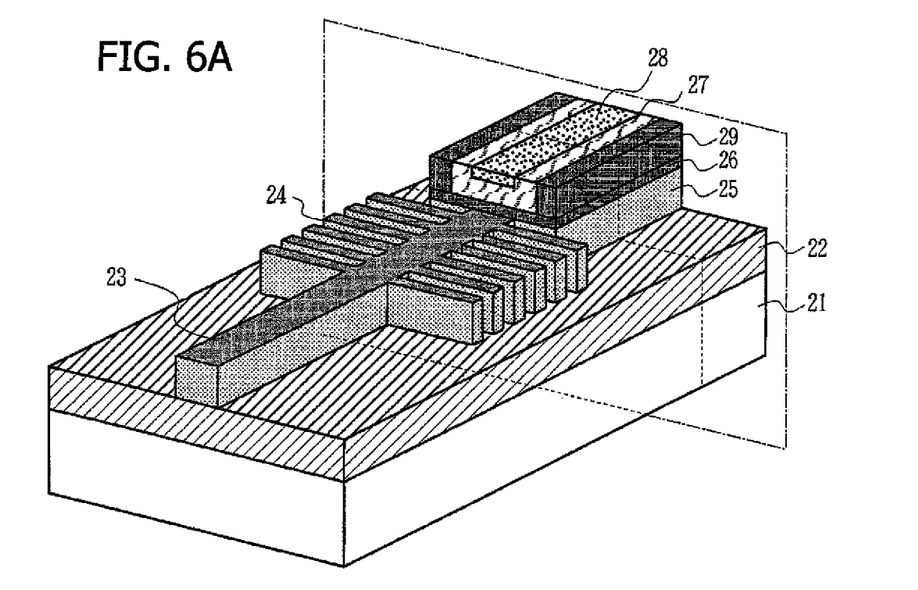
FIGS. 6A and 6B are diagrams illustrating a step after the step of FIGS. 5A and 5B during the manufacture of the semiconductor optical waveguide device according to the first embodiment of the present invention.
Figure 6B:
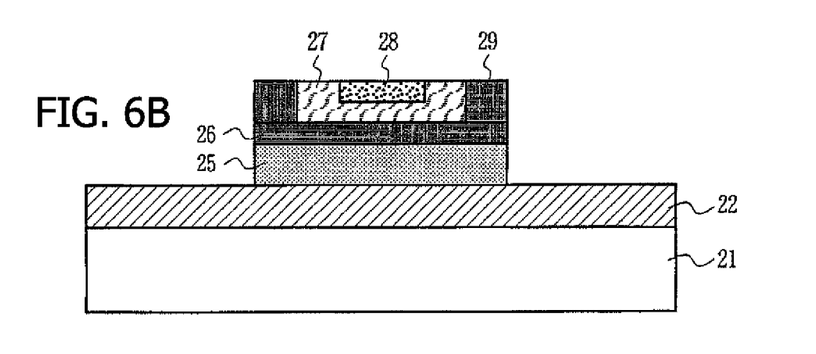
Figure 7A:
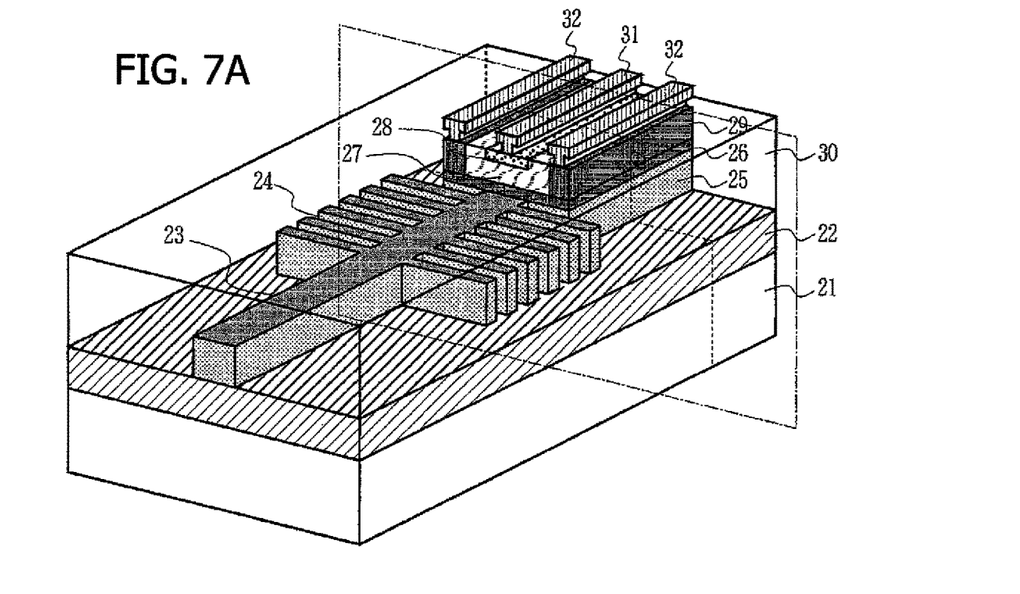
FIGS. 7A and 7B are diagrams illustrating a step after the step of FIGS. 6A and 6B during the manufacture of the semiconductor optical waveguide device according to the first embodiment of the present invention.
Figure 7B:
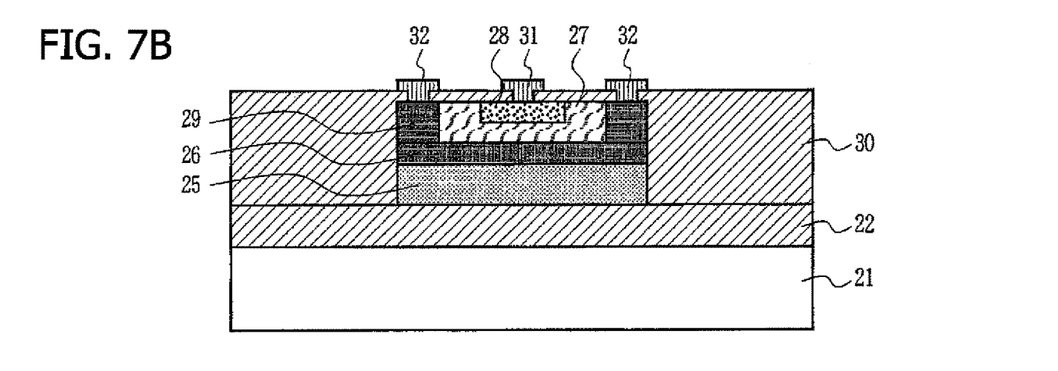

Next, in reference to FIGS. 5A to 7B, the manufacturing steps for the semiconductor optical waveguide device according to the first embodiment of the present invention is described. Here, FIGS. 5A, 6A, and 7A are schematic perspective diagrams, and FIGS. 5B, 6B, and 7B are cross sectional diagrams along a parallelogram of a single dotted chain line in FIGS. 5A, 6A, and 7A, respectively. First, as illustrated in FIG. 5A, a single crystal Si layer having a thickness of 220 nm that is provided on a Si substrate 21 with a BOX layer 22 having a thickness of 3 μm in between is processed so as to form a Si core layer 23, an anti-reflection diffraction grating 24 and a terrace for forming an element 25. At this time, a resist pattern (not shown) is formed by an electron beam lithography, and thus the monocrystalline Si layer is processed through dry etching. As described above, the width of the Si core layer 23 is 450 nm, the length and the width of the protruding portions of the anti-reflection diffraction grating 24 are 1.5 μm and 129 nm, respectively, the width of the gap portions is 352 nm, the period is 481 nm, and the number of repetitions is ten.

Next, as illustrated in FIGS. 6A and 6B, a $SiO_2$ mask (not shown) having an opening from which the terrace for forming an element 25 is exposed is provided, and this $SiO_2$ mask is used as a selective growth mask so as to form a Ge photodiode. First, a p type Ge layer 26 having a thickness of 50 nm is deposited, and then an i type Ge layer 27 having a thickness of 500 nm is deposited. Subsequently, P ions are implanted so as to form an n type Ge layer 28, and at the same time B ions are implanted on both sides so as to form a p type Ge layer 29.

Next, as illustrated in FIGS. 7A and 7B, the $SiO_2$ mask is removed and, after that, a $SiO_2$ film 30, which also acts as an upper clad layer, is provided so as to cover the entire surface, and contact holes for the n type Ge layer 28 and the p type Ge layer 29 are formed. Subsequently, an Al film is deposited on the entire surface and then is patterned so as to form an n side electrode 31 and p side electrodes 32 and, thus, the basic structure of the semiconductor optical waveguide device according to the first embodiment of the present invention is completed. Though the $SiO_2$ film is deposited after the $SiO_2$ mask has been removed, the $SiO_2$ mask may left as a part of the upper clad layer.

As described above, the anti-reflection diffraction grating of which the reflectance for signal light having a wavelength in the vicinity of 1.55 μm is −40 dB or less is provided in the vicinity of the portion connected to the Ge photodiode and, therefore, the amount of reflected light can be effectively reduced.

Second Embodiment

Figure 8:
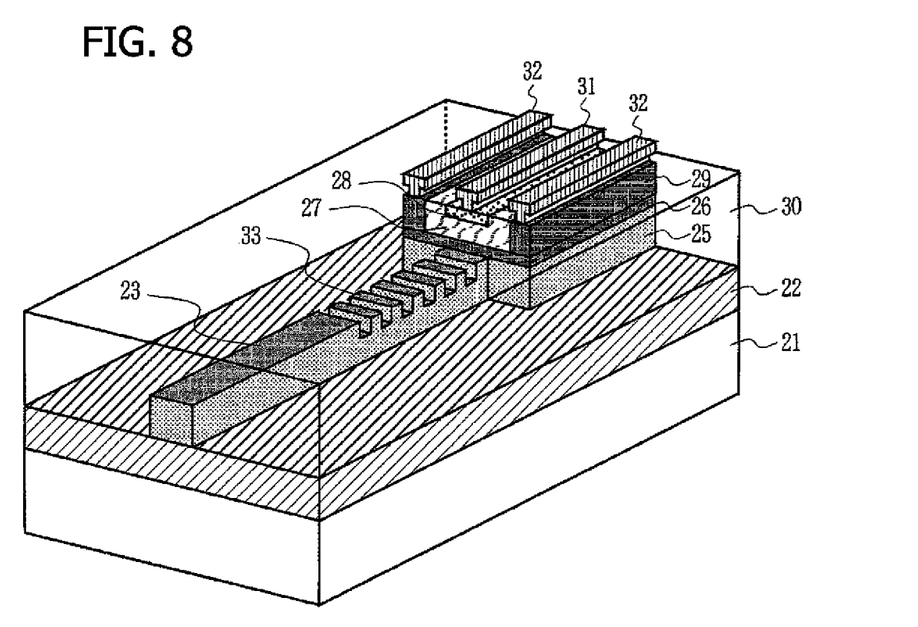
FIG. 8 is a schematic perspective diagram illustrating the semiconductor optical waveguide device according to the second embodiment of the present invention.

Next, in reference to FIG. 8, the semiconductor optical waveguide device according to the second embodiment of the present invention is described. The basic manufacturing process for the semiconductor optical waveguide device is the same as in the first embodiment except that the position in which the anti-reflection diffraction grating is provided differs and, therefore, only the final structure is described below. FIG. 8 is a schematic perspective diagram illustrating the semiconductor optical waveguide device according to the second embodiment of the present invention, wherein an SOI substrate where a monocrystalline crystal Si layer having a thickness of 220 nm is provided on a Si substrate 21 with a BOX layer 22 having a thickness of 3 μm in between is used. The monocrystalline crystal Si layer is processed so as to form an anti-reflection diffraction grating 33 on the side of the connection portion between a Si core layer 23 having a width of 450 nm and a Ge photodiode. The width of the protrusions is 129 nm, the width of the recesses is 352 nm, and the corrugation depth is 110 nm, respectively, which makes the period 481 nm, and the repetition number of the anti-reflection diffraction grating 33 is 20.

Thus, the anti-reflection diffraction grating need not be a diffraction grating on a side but may be provided on the upper surface of the Si core layer 23, where the light reflected from each corrugation in the anti-reflection diffraction grating 33 interferes with the light reflected from the Ge photodiode in the same manner as in the case of a diffraction grating on a side and, thus, the amplitude of the synthesized waves can be greatly reduced as a whole.

Third Embodiment

Figure 9A:
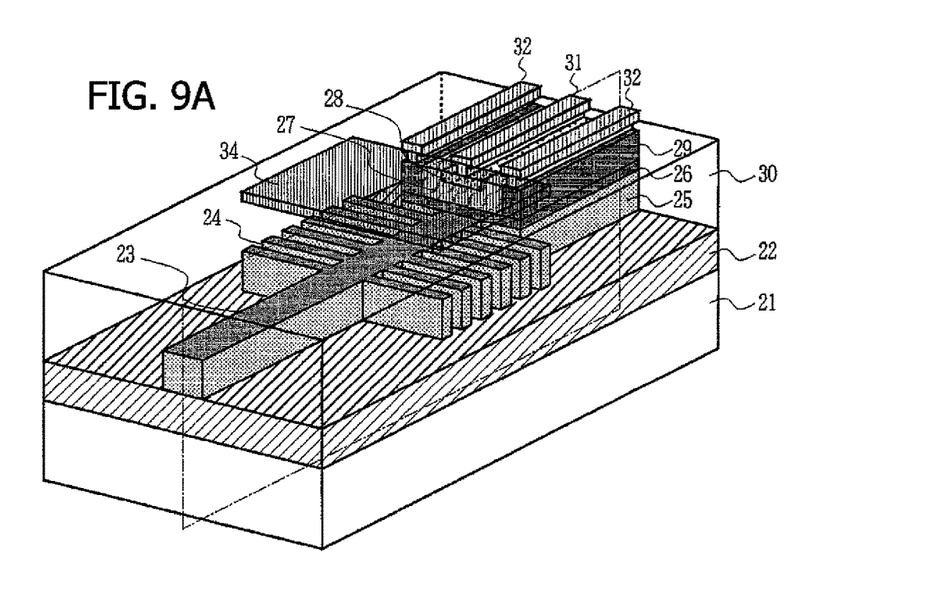
FIGS. 9A and 9B are diagrams illustrating the semiconductor optical waveguide device according to the third embodiment of the present invention.
Figure 9B:
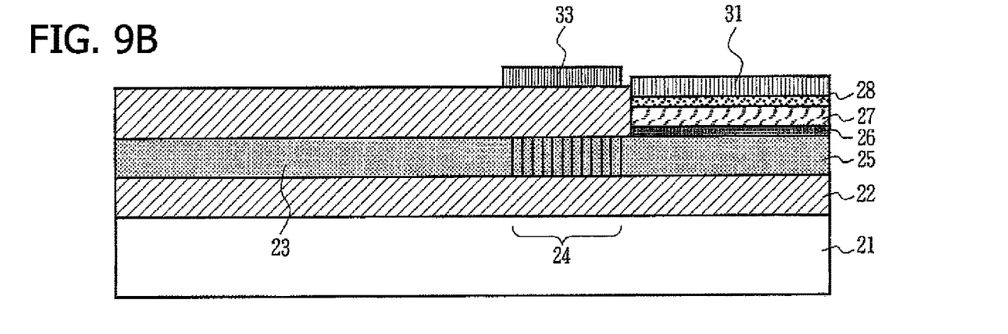

Next, in reference to FIGS. 9A and 9B, the semiconductor optical waveguide device according to the third embodiment of the present invention is described. This semiconductor optical waveguide device according to the third embodiment is the same as the semiconductor optical waveguide device according to the first embodiment except that a heater 34 is provided on top of the anti-reflection diffraction grating 24 and, therefore, only the final structure is described below.

FIGS. 9A and 9B are diagrams illustrating the semiconductor optical waveguide device according to the third embodiment of the present invention. FIG. 9A is a schematic perspective diagram and FIG. 9B is a cross sectional diagram along a parallelogram of a single dotted chain line in FIG. 9A. In the third embodiment, a Cr film is deposited by a vapor deposition method on the upper portion of the anti-reflection diffraction grating 24 with a SiO$_2$ film 30 that becomes an upper clad layer in between.

When a current is injected into this heater 34 the refractive index of the anti-reflection diffraction grating 24 is changed and, thus, the above described anti-reflection wavelength illustrated in FIG. 2B can be tuned. This can be used to match the wavelength in the case wherein it is desired to shift the operational wavelength or in the case wherein the gap between the diffraction grating and the Ge photodiode differs from the designed value due to variation in manufacture.

Fourth Embodiment

Figure 10A:
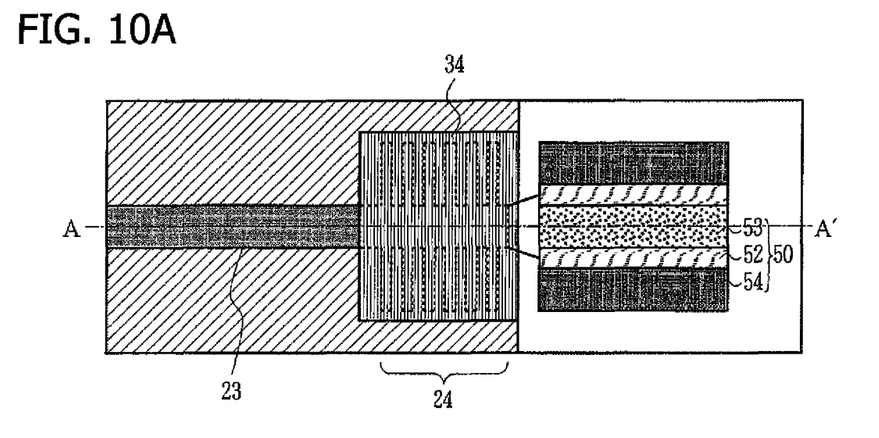
FIGS. 10A and 10B are diagrams illustrating the semiconductor optical waveguide device according to the fourth embodiment of the present invention.
Figure 10B:
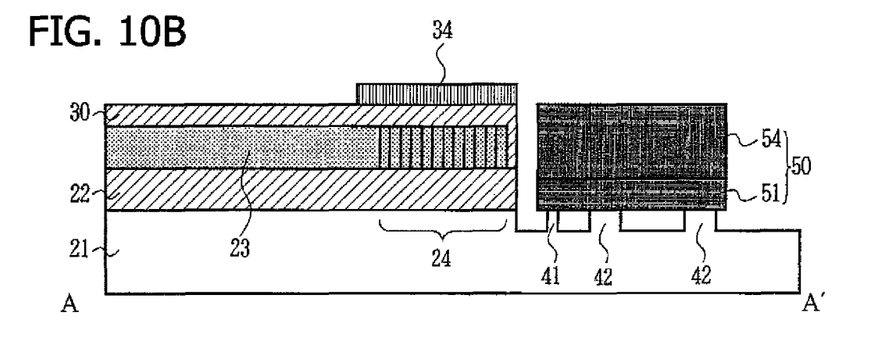

Next, in reference FIGS. 10A and 10B, the semiconductor optical waveguide device according to the fourth embodiment of the present invention is described. This semiconductor optical waveguide device according to the fourth embodiment is the same as the semiconductor optical waveguide device according to the first embodiment except that the Ge photodiode is integrated in a hybrid manner and, therefore, only the final structure is described below.

FIGS. 10A and 10B are diagrams illustrating the semiconductor optical waveguide device according to the fourth embodiment of the present invention. FIG. 10A is a schematic plan diagram, and FIG. 10B is a cross sectional diagram along a single dotted chain line A-A' in FIG. 10A. In the fourth embodiment, the Si core layer 23 is cut away so as to provide a terminal of the waveguide. Directly before the terminal an anti-reflection diffraction grating 24 is provided and, at the same time, a Cr film is deposited by a vapor deposition method on the upper portion of the anti-reflection diffraction grating 24 with a SiO$_2$ film 30 that becomes an upper clad layer in between so as to provide a heater 34. In the portion on which an element is mounted the Si substrate 21 that has been exposed by removing the monocrystalline Si layer and the BOX layer 22 is etched so as to provide an alignment mark 41 and pedestals 42.

The alignment mark 41 is used as a mark for positioning so as to mount the Ge photodiode 50 on the pedestals 42 using solder (not shown). Here, this Ge photodiode 50 is formed by growing a p type Ge layer 51 and an i type Ge layer 52 on another Si substrate, implanting P ions so to form an n type Ge layer 53 and implanting B ions on the two side so as to form a p type Ge layer 54. Subsequently, the Si substrate is removed through grinding and polishing and, after that, the Ge photodiode 50 is mounted on the pedestals 42. Here, electrodes and a SiO$_2$ passivation film on which electrodes are formed are not shown.

In this hybrid structure, the refractive index changes greatly in the end surface portion of the optical waveguide and, therefore, reflected light is easy to occur due to mode mismatch. However, the light that has propagated through the Si core layer 23 is emitted through the end portion of the Si core layer 23 and freely propagates in the window structure region towards the Ge photodiode 50, which expands the mode size. The light that has spread enters into the Ge photodiode 50. At this time there are components of light, resulting from the spreading of light, that enter diagonally and do not return back to the Si core layer 23 when reflected. That is to say, components that return back to the Si core layer 23 are reduced.

The reflected light that has returned and been reduced can be further effectively reduced by means of light interference in the anti-reflection diffraction grating 24. In this case as well, the anti-reflection wavelength can be tuned by injecting a current into the heater 34 so as to make the refractive index of the anti-reflection diffraction grating 24 change.

Fifth Embodiment

Figure 11A:
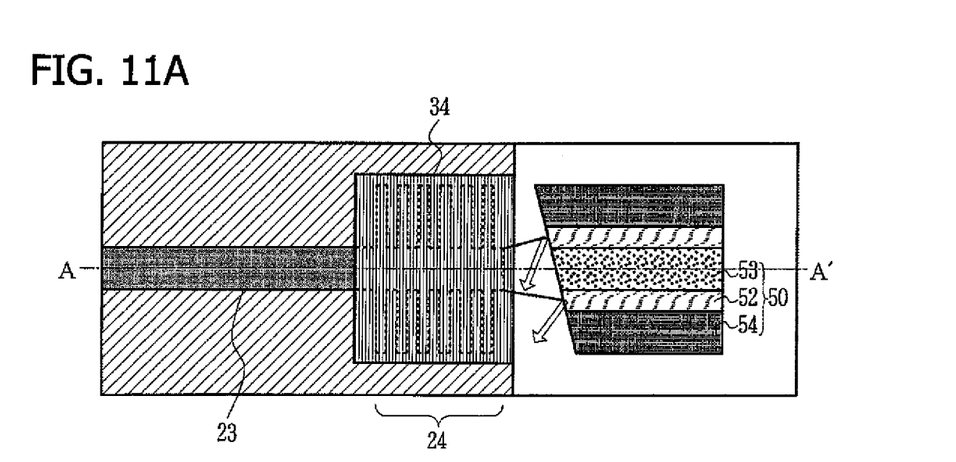
FIGS. 11A and 11B are diagrams illustrating the semiconductor optical waveguide device according to the fifth embodiment of the present invention.
Figure 11B:
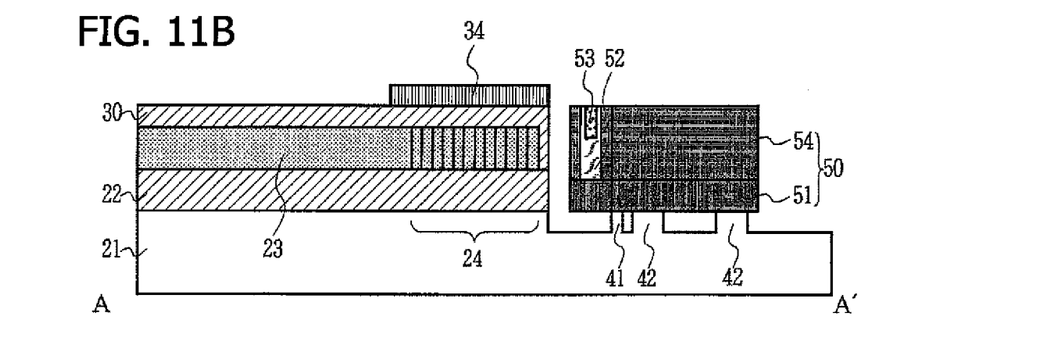

Next, in reference to FIGS. 11A and 11B, the semiconductor optical waveguide device according to the fifth embodiment of the present invention is described. This semiconductor optical waveguide device according to the fifth embodiment is the semiconductor optical waveguide device in which the incident end surface on the Ge photodiode in the fourth embodiment in inclined. The rest of the structure is the same as the semiconductor optical waveguide device according to the fourth embodiment and, therefore, only the final structure is described below.

FIGS. 11A and 11B are diagrams illustrating the semiconductor optical waveguide device according to the fifth embodiment of the present invention. FIG. 11A is a schematic plan diagram and FIG. 11B is cross sectional diagram along a single dotted chain line A-A' in FIG. 11A. In the fifth embodiment as well, the Si core layer 23 is cut away so as to provide a terminal of the waveguide. Directly before the terminal an anti-reflection diffraction grating 24 is provided and, at the same time, a Cr film is deposited by a vapor deposition method on the upper portion of the anti-reflection diffraction grating 24 with a SiO$_2$ film 30 that becomes an upper clad layer in between so as to provide a heater 34. In the portion on which an element is mounted the Si substrate 21 that has been exposed by removing the single crystal Si layer and the BOX layer 22 is etched so as to provide an alignment mark 41 and pedestals 42.

The alignment mark 41 is used as a mark for positioning so as to mount the Ge photodiode 50 on the pedestals 42 using solder (not shown). In the fifth embodiment the incident end surface of the Ge photodiode 50 is inclined relative to the end surface that is perpendicular to the optical axis in the fourth embodiment by 5° to 10°, for example by 7°.

In the fifth embodiment of the present invention, the light that has propagated through the Si core layer 23 is exited through the end portion of the Si core layer 23 and freely propagates in the window structure region towards the Ge photodiode 50, which expands the mode size. The light that has spread enters into the Ge photodiode 50. At this time, the light entered into the Ge photodiode 50 is reflected from the inclined end surface and propagates in the diagonal direction for an incident axis. Thus, components that return back to the Si core layer 23 are greatly reduced.

In this case as well, the reflected light that has returned and been reduced can be further effectively reduced by means of light interference in the anti-reflection diffraction grating 24. In this case as well, the anti-reflection wavelength can be tuned by injecting a current into the heater 34 so as to make the refractive index of the anti-reflection diffraction grating 24 change.

Sixth Embodiment

Figure 12A:
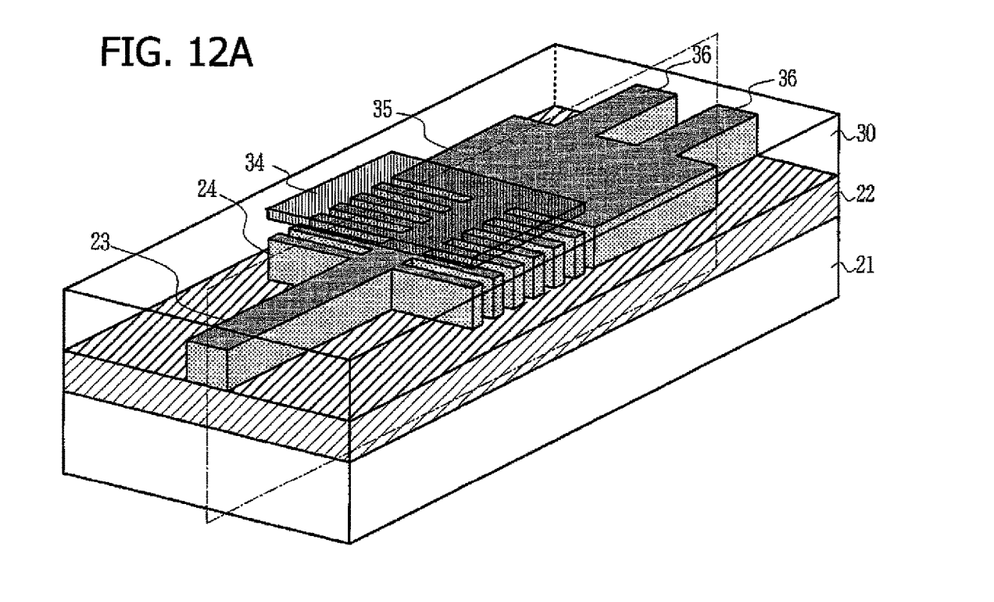
FIGS. 12A and 12B are diagrams illustrating the semiconductor optical waveguide device according to the sixth embodiment of the present invention.
Figure 12B:
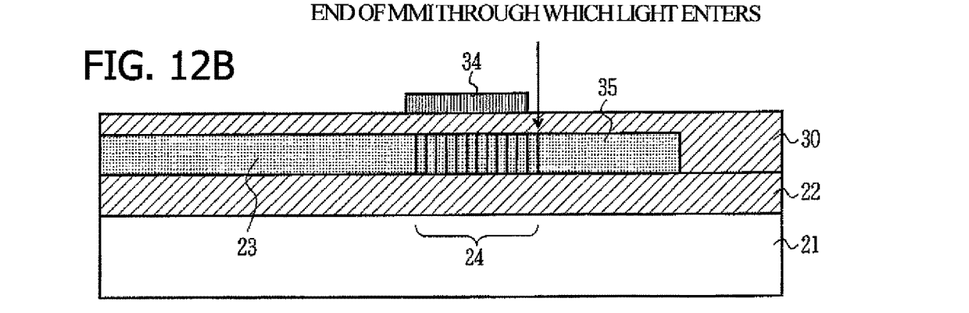

Next, in reference to FIGS. 12A and 12B, the semiconductor optical waveguide device according to the sixth embodiment of the present invention is described. This semiconductor optical waveguide device according to the sixth embodiment is provided with a 1:2 type MMI (multimode interferometer), which is an optically functional element. FIGS. 12A and 12B are diagrams illustrating the semiconductor optical waveguide device according to the sixth embodiment of the present invention. FIG. 12A is a schematic perspective diagram and FIG. 12B is a cross sectional diagram along a parallelogram of a single dotted chain line in FIG. 12A.

In the sixth embodiment, a 1:2 type MMI 35 with two branches is formed simultaneously when a semiconductor optical waveguide having an anti-reflection diffraction grating 24 is formed by etching a monocrystalline Si layer. In this case as well, a patterned Cr layer is provided on the upper surface of the anti-reflection diffraction grating 24 with a $SiO_2$ film 30 that becomes an upper clad layer in between so as to form a heater 34.

The light that has propagated through the Si core layer 23 enters into the MMI 35 and splits into two output waveguides 36 so as to be output. The light reflected from the incident end of the MMI 35 occurs, but this reflected light is reduced by the anti-reflection diffraction grating 24. In this case as well, the anti-reflection wavelength can be tuned by injecting a current into the heater 34 so as to make the refractive index of the anti-reflection diffraction grating 24 change.

Here, the conditions and structures described in the above embodiments are merely examples and various types of modifications are possible. For example, a heater may be provided above the anti-reflection diffraction grating in the second embodiment as well, wherein the anti-reflection diffraction grating is provided on the upper surface of the Si core layer. In addition, instead of the diffraction grating on a side in the fourth to sixth embodiments, a diffraction grating may be formed on the upper surface of the Si core layer so as to provide an anti-reflection diffraction grating in the same manner as in the second embodiment.

Though the photodiodes in the first to fifth embodiments are Ge photodiodes, a SiGe photodiode having a predetermined mixed crystal ratio in accordance with the wavelength signal light may be used. Though a photodiode is provided as an optically functional element in the first to fifth embodiments, an electro-absorption modulator using Ge or SiGe may be used.

Though Cr is used as the material for the heater in the third to sixth embodiments, the material is not limited to Cr but other materials such as Ni or TiN may be used. Though a heater is used as a temperature control element in the third to sixth embodiments, a Peltier effect element may be used. In this case, a Peltier effect element that has been made separately may be pasted onto the upper clad layer using an adhesive. In the case of a Peltier effect element, both heating and cooling are possible depending on the direction in which the current is injected.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor optical waveguide device, characterized by comprising: a semiconductor substrate; an optically functional element provided on the semiconductor substrate; and a semiconductor optical waveguide with a core layer comprising an anti-reflection diffraction grating that is provided on the semiconductor substrate and which has the period to prevent light that has been led towards a portion connected to the optically functional element from being reflected in the direction from which the light has been led, wherein the anti-reflection diffraction grating is formed on both lateral sides of the core layer of the semiconductor optical waveguide along the direction of optical propagation.

2. The semiconductor optical waveguide device according to claim 1, characterized in that a temperature control element is provided on an upper clad layer in a region where the anti-reflection diffraction grating is provided.

3. The semiconductor optical waveguide device according to claim 2, characterized in that the temperature control element is either a heating resistor element or a Peltier effect element.

4. The semiconductor optical waveguide device according to claim 1, characterized in that the optically functional element is a semiconductor light receiving element that is formed of a different type of material from the material of a monocrystalline semiconductor layer that forms the core layer of the semiconductor optical waveguide on a portion of the monocrystalline semiconductor layer that extends from the semiconductor optical waveguide.

5. The semiconductor optical waveguide device according to claim 1, characterized in that the optically functional element is a 1:2 type multi-mode optical interference waveguide formed by using the portion of a monocrystalline semiconductor layer that extends from the semiconductor optical waveguide, where the monocrystalline semiconductor layer forms the core layer of the semiconductor optical waveguide.

6. The semiconductor optical waveguide device according to claim 1, characterized in that an end surface of the optically functional element on the connection portion side and an end surface of the core layer of the semiconductor optical waveguide face each other through the connection portion.

7. The semiconductor optical waveguide device according to claim 6, characterized in that the end surface of the optically functional element of the connection side is inclined relative to the direction of the optical axis of the core layer of the semiconductor optical waveguide.

8. The semiconductor optical waveguide device according to claim 1, characterized in that the semiconductor substrate is a monocrystalline Si substrate in an SOI substrate where a monocrystalline Si layer is provided on the monocrystalline Si substrate with an oxide film in between, and the core layer is formed of the monocrystalline Si layer in the SOI substrate.

* * * * *